Patented Mar. 17, 1953

2,631,952

UNITED STATES PATENT OFFICE 2,631,952

SOLDERING FLUX AND PROCESS OF MANUFACTURE

Harrison L. Williams, Cleveland, Ohio, assignor to Thermoflux Products Inc., a corporation of Ohio No Drawing. Application December 29, 1949, Serial No. 135,820

3 Claims. (Cl. 148—25)

This invention relates to soldering fluxes and to pastes obtained by dispersing powdered metal solders therein. Such pastes are highly desirable in that but one operation is required to apply both flux and paste, which greatly reduces the time and labor cost. Moreover, paste lends itself to simple manual or hand operations by means of stiff brushes, spatulas, hand plunger guns, etc.; metal parts to be soldered also can be dipped in solutions made by thinning the paste, or the paste can be transferred by rollers; and in many types of work, manual, semi or automatic mechanization can be used to apply the paste while the metal parts to be soldered are in motion. As a result, the output can be increased from 2 to 10 times with a saving of many man hours as well as in the amount of solder used.

In general solder-and-flux pastes depend upon aqueous solutions of a chloride, such as zinc chloride that acts as a deoxidizing agent, and the solutions are used as suspension media or vehicles for the metal powders. Such pastes have long been known, but, in general, they are open to the objections of rapid drying, lack of ability to hold the powdered metal in suspension without constant agitation, and non-uniformity of application due to the crystallization of the chloride. To offset these disadvantages, the water content has been increased; but the watery mixtures have exhibited such highly corrosive action as to create distrust in them. Thickening of the watery mixtures by the inclusion of petroleum greases and oils is objectionable because of separation of the water-soluble salts and of the formation of heavy residues upon heating that are hard to remove. These disadvantages are resident not only in the low-melt or soft solder pastes but also in the brazing or high temperature solder pastes that include percentages of borax; the latter, moreover, cannot hold material amounts of water, dry very rapidly to heavy masses, and the borax glass residue, remaining after heating is practically insoluble and very difficult to remove.

As intimated, corrosion is a principal factor determining the usefulness of a flux, particularly in the electrical field. and this precludes for many applications an amount of water beyond that required for solution of the chloride crystals; for the same reason the flux should be non-hygroscopic to all intents and purposes. Accordingly, the pH of the composition is generally regarded as of importance in dictating its usefulness. Likewise, the applications of the paste require as high a viscosity as is practicable from the standpoint of control of flow and prevention of waste, and this requirement places a further limitation on the water content.

According to the present invention, light, stable, non-corrosive or substantially so fluxes are obtainable that do not dry rapidly, that maintain heavy metal powders in suspension in the form of viscous solder pastes, and that when heated do not leave heavy insoluble residues. It depends upon the inclusion of liquid or oily polyalkylene glycols or diols and their monohydroxy and ester derivatives, preferably the water-soluble products or relatively high viscosity (sold under the trade-mark "Ucon" and described as the 50 HB and 75H series in a booklet entitled "Ucon Brand Fluids and Lubricants" issued by Union Carbide and Carbon Corp., New York city, N. Y., and in Patents 2,425,755, 2,425,845, 2,448,644, 2,457,139, these have molecular weights from about 300 to 15,000 and have a foam-depressing effect according to the last half of the second column of page 12 of the booklet). They possess to a high degree the property of wetting the metal surface to which they are applied; they are resistant to oxidation and gumming; they have the chemical reactivity of monohydric alcohols; and they are soluble in water at ordinary room temperatures, though solubility of the 50 HB series decreases with increase in temperature until at the boiling point of water, it is quite low. These oils, however, are not compatible with the usual aqueous zinc chloride solution upon mechanical mixing.

It has been discovered that a polydiol or derivative oil can be brought into compatibility with a chloride or other halide solution by means of an ether-ester, such as a polyglycol reacted with an acylating agent; butoxyethyl-diglycol-carbonate is an example of such an ether-ester; the agent can be added to the extent of one to 20 percent of the total composition. Apparently, it takes part in a reaction with the oil, for it thickens and stabilizes the mixture. A wide range of viscosities results in accordance with the percentage (from 1 to 25 percent) added.

The presence of the ether-ester, however, has been found to have objections; and it has been further discovered that it is possible to omit such an agent and yet secure compatibility of halide solution and polyglycol oil by a technic that is dependent on continued agitation over the range of temperature from a high, necessary to liquify the chloride crystals, down to a low, at which compatibility with the oil appears. In brief, the oil is added with agitation to the hot aqueous solution, with which it is incompatible, and the agitation is continued until the mixture is cool enough for compatibility; two objectives are thus attained, namely, prevention of crystals separation and increasing solubility of the oil as the mixture cools. In this manner, stable non-drying compositions of any desired water content and density to suspend heavy metal powders have been obtained and in addition compositions that do not leave heavy or insoluble residues in soldering operations.

In the preparation of fluxes according to this invention, compositions ranging from strongly acid to neutral or alkaline are obtainable. Illustrative examples follow:

*Example 1*

A weakly acid base solution (pH of 3-4) was made by mixing—

| | Parts |
|---|---|
| Zinc chloride | 78.3 |
| Water | 21.7 | and heated to 280° F. for a period of one hour. To the base solution was added from one to 25 percent of the weight of the total composition of a polyglycol (Ucon oil 50 HB 3520; the numeral 3520 is the viscosity in Saybolt seconds at 100° F., and the booklet mentioned in table 7 on page 20 shows that Ucon polyglycols of the 50 HB series in proportions of 50 per cent or less of the aqueous solutions separate at a temperature ranging from 108 to 140° F.). As stated in the foregoing, the introduction of an ether-ester (from one to 20 percent by weight of the total mixture can be used to vary the viscosity) secured compatibility to thicken over a wide range of viscosities depending on the percentage of the oil. The preferred procedure followed, however, was to incorporate the oil at the temperature at which the zinc chloride crystals go into aqueous solution (280° F.) while the solution was being agitated, and then cooling the mixture under constant agitation; under this procedure crystal separation did not occur and the oil gradually went into uniform dispersion as the mixture cooled. The result was a compatible liquid-to-semi-solid paste (dependent on viscosity and proportion) with which customary powdered metal or alloy solders were admixed to form uniform stable suspensions. Upon decomposition of the flux by heating in a soldering operation a pH of about 6 was developed. The paste is intended for general duty, such as soldering joints and fittings of copper, bronze, tin and cadmium plate, etc.

The viscosities can be further increased, if desired, by the addition to the flux of a normally solid polyalkylene glycol (sold under the trademark "Carbowax") that is water-soluble; these waxes can be obtained over a range from very soft to very hard solids. On the other hand, the flux composition can be thinned by a solution, e. g., one part of the oil in 50 parts of water, in order to reduce the viscosities.

*Example 2*

A strongly acid base solution (pH 2-3) was prepared from:

| | Parts |
|---|---|
| Base solution of Example 1 | 81.1 |
| Ammonium chloride | 14.1 |
| ± Stannous chloride | 4.8 | and heated to approximately 250° F., or until the chlorides were in solution. The solution was then placed in a mixer and beaten until nearly cool (about 100–120° F.). A glycol, as in foregoing Example 1, was incorporated while the solution was hot or at 250° F., i. e., preferably before any cooling had taken place, and the mixture was then beaten until cool. To this was added a powdered metal solder, and a stable suspension obtained useful for soldering stainless and alloy steels, silver, gold, etc.; upon flux decomposition by heating the pH was about 4.5.

*Example 3*

Example 1 was repeated but substituting another glycol oil (sold under the designation Ucon 75H90,000). It gave comparable results, when metal solder was suspended therein, and the composition used in a soldering operation.

*Example 4*

A neutral flux composition (pH of 7) resulted from:

| | Parts |
|---|---|
| Glutamic acid hydrochloride | 1.5 |
| Urea | 1.0 |
| Ucon oil (75H90,000) | 43.0 |

The glutamic acid hydrochloride and urea were directly introduced into the oil by mechanical mixing, water not being necessary for solution; by the substitution of the oil for water, ionization is avoided and the pH is thus kept at the neutral point. A wetting agent, such as "Tergitol" (about 0.5 part), however, is preferably included. When thickened to the desired degree by small amounts (4.0 part) of a solid polyglycol (Carbowax 4000), it was found that practically any amount of metal powder could be suspended therein to form stable non-hygroscopic pastes (maximum water absorption about 1.5 per cent). The pastes are useful for general electrical work, radio wiring, etc.

In the use of a paste for soldering, the metal parts to be soldered are brought to the temperature consistent with the flow point of the solder as rapidly as possible, and the paste is applied and heated to the flow point as by a furnace, incandescent carbon resistance, high frequency induction, torch, soldering iron, etc.; the paste offers sufficient protection so that the use of atmospheric-controlled furnaces is not necessary. A maximum of surface protection with a minimum of residual skin or film after fusion the joining alloy is thus provided, and any excess of film is soluble in water. The annoyance of acrid vapors and toxic effects therefrom is substantially eliminated.

What is claimed is:

1. Soldering flux in liquid to semi-solid paste form comprising essentially a water solution of zinc chloride and a liquid polyglycol product having a molecular weight in the range of 300 to 15,000 and water-soluble at normal room temperature, said product constituting from one to twenty-five percent of the solution, and said solution being characterized by absence of crystal separation on standing and by non-drying.

2. Soldering flux in liquid to semi-solid paste form comprising essentially a water solution of zinc chloride and ammonium chloride and a liquid polyglycol product having a molecular weight in the range of 300 to 15,000 and water-soluble at normal room temperature, said product constituting from one to twenty-five percent of the solution, and said solution being characterized by absence of crystal separation on standing and by non-drying.

3. Process of preparing a flux for solder of an aqueous zinc chloride solution and a liquid polyglycol product incompatible therewith and of low solubility in boiling water but soluble at normal room temperature which comprises heating the zinc chloride in water to its liquifying temperature, adding with agitation the polyglycol product to the hot solution, and continuing the agitation until the solution cools to a temperature at which no separation of the product occurs whereby crystallization of the chloride is prevented and a stable solution results.

HARRISON L. WILLIAMS.

REFERENCES CITED

The following references are of record in the file of this patent:

UNITED STATES PATENTS

| Number | Name | Date |
|---|---|---|
| 804,664 | Leisel | Nov. 14, 1905 |
| 1,783,925 | Mougey | Dec. 2, 1930 |
| 2,228,352 | Hopfield | Jan. 14, 1941 |
| 2,260,986 | Coleman | Oct. 28, 1941 |
| 2,481,457 | Vana | Sept. 6, 1949 |
| 2,493,372 | Williams | Jan. 3, 1950 |
| 2,548,690 | Vieno | Apr. 10, 1951 |

FOREIGN PATENTS

| Number | Country | Date |
|---|---|---|
| 591,047 | Great Britain | Aug. 5, 1947 |